Figure 1:
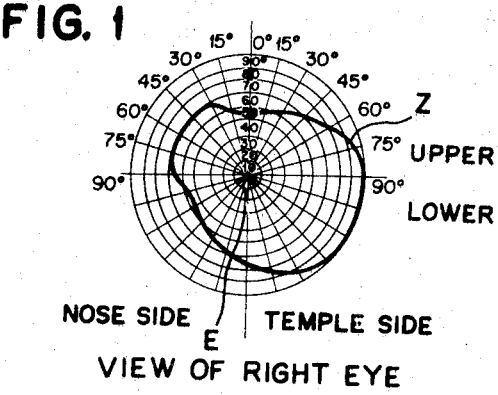

United States Patent

[11] 3,524,380

[72] Inventors Takeo Yamada
Tokyo, Japan;
Jun Shimomura, Tokyo, Japan
[21] Appl. No. 618,808
[22] Filed Feb. 27, 1967
[45] Patented Aug. 18, 1970
[73] Assignee Nippon Kogaku K.K.
Tokyo, Japan
a Corp. of Japan

[54] FINDER FOR SINGLE LENS REFLEX CAMERAS INCLUDING MEANS TO VIEW ASSOCIATED CAMERA STRUCTURE
1 Claim, 9 Drawing Figs.
[52] U.S. Cl. .................................................. 88/1.5
[51] Int. Cl. ............................................. G03b 13/18
[50] Field of Search ............................................ 88/1.5;
95/42, 44

[56] References Cited
UNITED STATES PATENTS

| | | | |
|---|---|---|---|
| 3,174,416 | 3/1965 | Heerklotz .................... | 88/1.5X |
| 3,250,196 | 5/1966 | Ort et al ...................... | 88/1.5UX |
| 3,326,104 | 6/1967 | Mische ........................ | 88/1.5(W)UX |

*Primary Examiner*—Ronald L. Wibert
*Assistant Examiner*—Orville B. Chew, II
*Attorney*—Anton J. Wille

ABSTRACT: A viewfinder for a single lens reflex camera in which an image of the exposure meter pointer, stop values or distance scales on the lens barrel, or exposure factors may be observed, the images being projected into the lower portion of the visual field. A reflecting surface is provided between the penta prism and the eyepiece of the view-finder below the ocular axis, the image rays being directed through the penta prism onto the reflecting surface and reflected upwardly into the lower portion of the viewfinder.

Patented Aug. 18, 1970 3,524,380

VIEW OF RIGHT EYE

FINDER FOR SINGLE LENS REFLEX CAMERAS INCLUDING MEANS TO VIEW ASSOCIATED CAMERA STRUCTURE

This invention relates to a view-finder for single lens reflex cameras.

In accordance with the present invention, a view-finder is provided for a single lens reflex camera wherein a penta-dach prism is used in conjunction with a reflecting surface, the reflecting surface being disposed between the prism and an eye-piece lens to reflect the image rays which pass through the front non-reflecting surface of the prism from the exposure meter indicator, and the like, onto the lower or lower, outer portion of the visual field of the view-finder.

Single lens reflex cameras having view-finders wherein the pointer of an exposure meter, stop values, or similar exposure factors, or distance scales can be observed, are already known. Such exposure guides are generally over-lapped on the field of view of the finder, or placed on the upper outside portion or on one side of the field view.

The object of the present invention is to place the images of such exposure factors, or the like, on the lower or lower, outside portion of the field of view of the view-finder more in keeping with a human engineering point of view respecting eye responsiveness and acuity.

Figure 3A:
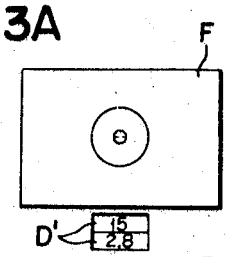
Figure 3B:
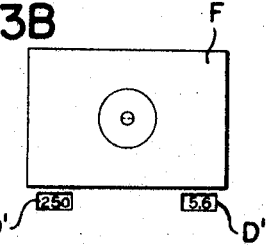
Figure 3C:
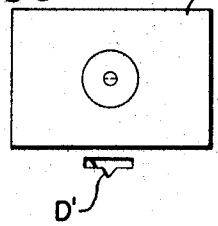
Figure 2A:
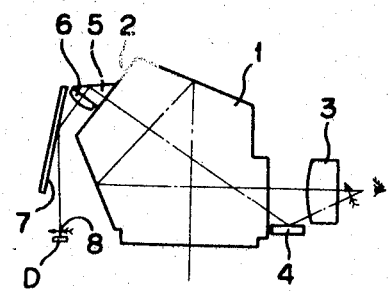
Figure 2B:
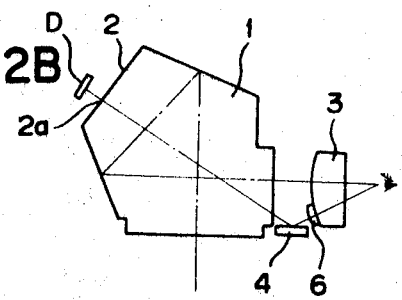
Figure 2C:
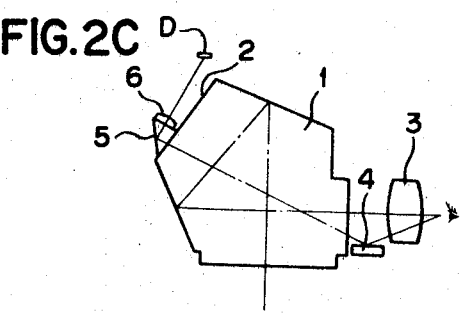
Figure 4A:
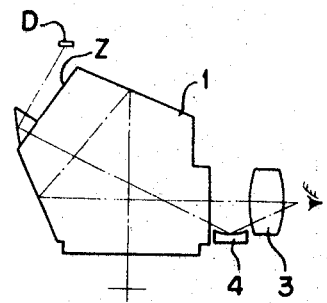
Figure 4B:
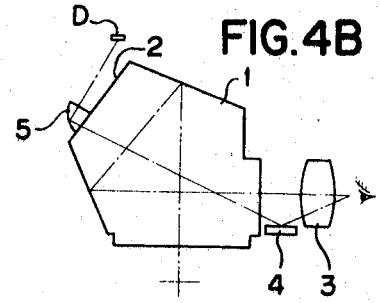

Other objects, advantages and features of the present invention will be more clearly understood referring to the following description in conjunction with illustrative embodiments of the invention shown in the drawing, in which:

FIG. 1 shows a chart of the responsiveness of the human eye over the entire 360° field of view;

FIGS. 2A, 2B and 2C, respectively show schematically, various embodiments of the present invention;

FIGS. 3A, 3B and 3C, respectively show the visual fields observed in the embodiments illustrated in FIGS. 2A, 2B, and 3C; and FIGS. 4A and 4B, respectively show schematically another embodiment of the present invention.

FIG. 1 shows the responsiveness of the human eye over the entire field of view, in which E represents the central position of the eye and Z shows the border or edge of the visual field. As viewed from the standpoint of human engineering the visual field of a human eye is wider in the lower portion than in the upper portion as apparent from FIG. 1, the greater lobe being in the lower, outer portion. It is known that less fatigue is felt and it is easier to observe objects which are in the lower portion of the field of view and preferably when such objects are in the lower, outer portion of the visual field.

With this consideration of the responsiveness of the human eye, and referring now to FIG. 2A of the drawings, the object D, which may be an exposure factor, or the like, is engraved on the camera lens barrel, mounting rings, etc. (not shown). A penta dach prism 1 is provided having a non-reflecting surface 2 and cooperates with an eyepiece 3. Disposed between the prism 1 and the eyepiece 3 and below the optical axis of the prism and eyepiece, is a reflective surface member 4. Cooperating with the prism surface 2 is another prism 5, which, together with an auxiliary lens 6, and a reflecting surface 7, reflects the image rays of the object D, as for example arrow 8 in FIG. 2A, through the prism 1 onto reflective member 4 and through the eyepiece into the lower portion of the field of view to provide an image D' as shown in FIG. 3A.

FIG. 2B shows an embodiment wherein the object D such as a scale interlocked to the exposure factors, is provided within a camera body, and the light penetrating portion 2a is provided on a portion of the non-reflecting surface 2. The object D is directly observed, and the auxiliary lens 6, compensating for the length of light path, is connected to the lower portion of eye-piece lens 3. The observed image D' in the visual field is shown in FIG. 3B.

FIG. 2C is another embodiment wherein it is possible to observe the object D from the upper portion of a camera as well as from the back side of the camera as in the case of an exposure meter pointer provided on the upper portion of the camera body. In this embodiment, the image D' of the object D is normal, and the position thereof being formed at the lower portion of the visual field of the finder as is shown in FIG. 3C.

The auxiliary lens 6, compensating for the length of light path, is used for adjusting the degree of distinctiveness of the images of the two optional systems, i.e., the optical system for the view-finder and the optical system for observing the object, when there is a large difference between the lengths of light paths of the two optical systems. It is not always necessary to use an auxiliary lens as illustrated, the reflecting surface of member 4 or 5 may be a concave or convex mirror, respectively, as shown in FIG. 4A or 4B, and achieve the same results.

In accordance with the present invention as described above, the view-finder provided thereby is such that the scales or indicators are observed at the lower portion of the view frame of the finder in conformity with the responsiveness of the human eye without shielding or over-lapping of images in the finder view. The view-finder arrangement of the present invention is such that it is not necessary to increase the size of the penta dach prism for this purpose, thus providing a very compact and simple arrangement without adding to the camera, particularly in the vicinity of the camera lens, another optical system to provide the exposure factor images in the view-finder as in the prior art.

We claim:

1. In a view-finder for a single lens reflex camera having a penta prism and an eye lens, the combination comprising:
   a reflecting surface member disposed between the prism and the eye lens, the reflecting surface of said member being below and approximately parallel with the light ray path of the finder view field along the optical axis of the eye lens,
   a transparent portion of a non-reflecting front surface of the penta prism provided above the optical axis of the eye lens,
   and means adjacent said transparent portion for directing the light rays from an object through said transparent portion and through the penta prism onto the surface of said reflecting surface member for reflecting the light rays into the lower portion of the field view of the eye lens, the light ray path of the object obliquely crossing the optical axis of the eye lens in the penta prism.